US012812647B2

(12) United States Patent
Salah

(10) Patent No.: US 12,812,647 B2
(45) Date of Patent: Nov. 24, 2026

(54) METHOD AND APPARATUS FOR SCHEDULING OF PHYSICAL UPLINK CONTROL CHANNEL (PUCCH) CARRIER SWITCHING IN MOBILE COMMUNICATIONS

(71) Applicant: MediaTek Singapore Pte. Ltd., Singapore (SG)

(72) Inventor: Abdellatif Salah, Cambridge (GB)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 418 days.

(21) Appl. No.: 18/561,453

(22) PCT Filed: May 27, 2022

(86) PCT No.: PCT/CN2022/095536
§ 371 (c)(1),
(2) Date: Nov. 16, 2023

(87) PCT Pub. No.: WO2022/247928
PCT Pub. Date: Dec. 1, 2022

(65) Prior Publication Data

US 2024/0244626 A1 Jul. 18, 2024

Related U.S. Application Data

(60) Provisional application No. 63/193,628, filed on May 27, 2021.

(51) Int. Cl.
*H04W 72/21* (2023.01)
*H04L 5/00* (2006.01)

(52) U.S. Cl.
CPC ............ *H04W 72/21* (2023.01); *H04L 5/001* (2013.01)

(58) Field of Classification Search
CPC ...... H04W 72/21; H04W 72/23; H04L 5/001; H04L 5/0053; H04L 5/0096
See application file for complete search history.

(56) References Cited

U.S. PATENT DOCUMENTS 10,687,316 B2 6/2020 Chen et al.
11,711,824 B2 7/2023 Xiong et al.
(Continued)

FOREIGN PATENT DOCUMENTS

CN 107078871 A 8/2017
CN 111903170 A 11/2020
WO 2021/078189 A1 4/2021

OTHER PUBLICATIONS

VIVO; "Remaining issues on cross-carrier scheduling with mix numerologies," 3GPP TSG-RAN WG1 Meeting #100bis; R1-2001692; Apr. 2020; pp. 1-4.
(Continued)

*Primary Examiner* — Jamal Javaid
(74) *Attorney, Agent, or Firm* — McClure, Qualey & Rodack, LLP

(57) ABSTRACT

Various schemes for scheduling of physical uplink control channel (PUCCH) carrier switching with respect to user equipment (UE) and network apparatus in mobile communications are described. An apparatus, such as a UE, may receive a physical downlink control channel (PDCCH) on a first component carrier (CC). The apparatus may receive downlink data on a physical downlink shared channel (PDSCH) on the first CC scheduled by the PDCCH. The apparatus may receive a physical uplink control channel (PUCCH) carrier pattern on the first CC, wherein the PUCCH carrier pattern is configured per PUCCH cell group. The apparatus may transmit uplink control information
(Continued)

(UCI) corresponding to the downlink data on a PUCCH on a second CC according to the PUCCH carrier pattern.

14 Claims, 4 Drawing Sheets

(56) References Cited

U.S. PATENT DOCUMENTS

| | | | | |
|---|---|---|---|---|
| 2018/0139766 | A1 | 5/2018 | Dinan | |
| 2021/0091915 | A1* | 3/2021 | Khoshnevisan | H04W 72/53 |
| 2022/0279456 | A1* | 9/2022 | Babaei | H04W 52/146 |

OTHER PUBLICATIONS

International Search Report and Written Opinion dated Jul. 28, 2022, issued in application No. PCT/CN2022/095536.

* cited by examiner

METHOD AND APPARATUS FOR SCHEDULING OF PHYSICAL UPLINK CONTROL CHANNEL (PUCCH) CARRIER SWITCHING IN MOBILE COMMUNICATIONS

CROSS REFERENCE TO RELATED PATENT APPLICATION(S)

The present disclosure claims the priority benefit of U.S. Provisional Patent Application No. 63/193,628, filed on 27 May 2021. The contents of aforementioned application are herein incorporated by reference in their entirety.

TECHNICAL FIELD

The present disclosure is generally related to mobile communications and, more particularly, to scheduling of physical uplink control channel (PUCCH) carrier switching with respect to user equipment (UE) and network apparatus in mobile communications.

BACKGROUND

Unless otherwise indicated herein, approaches described in this section are not prior art to the claims listed below and are not admitted as prior art by inclusion in this section.

In Long-Term Evolution (LTE) or New Radio (NR), hybrid automatic repeat request-acknowledgement (HARQ-ACK) information transmission is introduced to improve transmission reliability and robustness. The user equipment (UE) needs to report HARQ-ACK information for corresponding downlink receptions in a HARQ-ACK codebook. The HARQ-ACK codebook should be transmitted in a slot indicated by a value of a HARQ feedback timing indicator field in a corresponding downlink control information (DCI) format. The DCI format should also indicate the physical uplink control channel (PUCCH) resource scheduled for the HARQ-ACK information transmission. HARQ-ACK multiplexing can be used to facilitate HARQ-ACK information transmission. Multiple HARQ-ACK feedbacks corresponding to multiple physical downlink shared channel (PDSCH) transmissions may be accumulated, multiplexed and transmitted to the network apparatus at once. One PUCCH resource may be used to carry multiple HARQ-ACK feedbacks to be transmitted in the same slot.

The current framework of transmission of HARQ feedback bits is not suitable for URLLC. URLLC is introduced for emerging applications that demands high requirements on end-to-end latency and reliability. A general URLLC requirement is that a packet of size 32 bytes shall be transmitted within 1 millisecond end-to-end latency with a success probability of $10^{-5}$. URLLC traffic is typically sporadic and short whereas low-latency and high-reliability requirements are stringent. For example, the control reliability of URLLC has to be stricter than the data reliability which is up to $10^{-6}$ BLER. Accordingly, allowing only one PUCCH resource for HARQ feedback bits transmission in an uplink slot will add to transmission latency.

On the other hand, multi-link operation is introduced to increase system capacity and transmission efficiency of the communication systems. Multi-link operation can be implemented by carrier aggregation (CA) or dual connectivity (DC), where additional links are used to increase the amount of data that can be transferred to and from the UE. The UE can be configured with more than one radio links (e.g., component carriers) and can connect to more than one network nodes (e.g., serving cells). Under the framework of CA, cross-carrier scheduling is supported to improve transmission efficiency and reduce latency. Cross-carrier scheduling enables the UE to connect to different network nodes for receiving the downlink data on different carriers. Cross-carrier scheduling may also be used to balance the loads from traffic and scheduling across different component carriers. Without cross-carrier scheduling, the downlink scheduling assignments on physical downlink control channel (PDCCH) are only valid for the component carrier (CC) on which they were transmitted. With cross-carrier scheduling, the downlink scheduling assignments can be received on a CC other than the one on which PDCCH is received.

However, in current NR framework, cross-carrier scheduling for uplink control information (UCI) transmission (e.g., PUCCH) is not supported. In 3$^{rd}$ Generation Partnership Project (3GPP) Release-16, PUCCH carrier is semi-statically configured to a single cell within a PUCCH cell group. In a time division duplex (TDD) system, the uplink/downlink TDD pattern is the bottleneck for the URLLC latency. TDD allows uplink and downlink to use the entire frequency spectrum, but in different time slots. Time is divided up into short slots and some are designated for uplink while others are designated for downlink. This approach enables asymmetric traffic and time-varying uplink and downlink demands. However, since PUCCH can only be scheduled in uplink slots, in an event that TDD pattern allocates more slots as downlink slots, the duration between uplink slots will be drawn too long and cause long latency. The worst case PUCCH alignment delay is dominated by the length of downlink and uplink and may be prohibitive to apply URLLC retransmission. Therefore, there is a need to introduce cross-carrier scheduling on PUCCH transmission and enhance UCI transmission for URLLC.

Accordingly, how to reduce alignment delay/latency and enhance reliability is an important issue for URLLC applications in the newly developed wireless communication network. Therefore, there is a need to provide proper cross-carrier scheduling mechanisms and UCI transmission enhancement for better performance when URLLC is supported.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to PUCCH carrier switching for HARQ feedback, and more particularly to scheduling of PUCCH carrier switching with respect to user equipment and network apparatus in mobile communications.

In one aspect, a method may involve an apparatus receiving a PDCCH on a first CC. The method may also involve the apparatus receiving a PDSCH on the first CC scheduled by the PDCCH. The method may further involve the apparatus receiving downlink data on a physical downlink shared channel (PDSCH) on the first CC scheduled by the PDCCH. The method may further involve the apparatus receiving a PUCCH carrier pattern on the first CC, wherein the PUCCH carrier pattern is configured per PUCCH cell group. The method may further involve the apparatus transmitting uplink control information (UCI) corresponding to the downlink data on a PUCCH on a second CC according to the PUCCH carrier pattern.

In another aspect, an apparatus may comprise a transceiver which, during operation, wirelessly communicates with a network node of a wireless network. The apparatus may also comprise a processor communicatively coupled to the transceiver. The processor, during operation, may perform operations comprising receiving, via the transceiver, a PDCCH on a first CC. The processor may also perform operations comprising receiving, via the transceiver, downlink data on a PDSCH on the first CC scheduled by the PDCCH. The processor may further perform operations comprising receiving, via the transceiver, a PUCCH carrier pattern on the first CC, wherein the PUCCH carrier pattern is configured per PUCCH cell group. The processor may further perform operations comprising transmitting, via the transceiver, UCI corresponding to the downlink data on a PUCCH on a second CC according to the PUCCH carrier pattern.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IOT) and Narrow Band Internet of Things (NB-IOT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Figure 1:
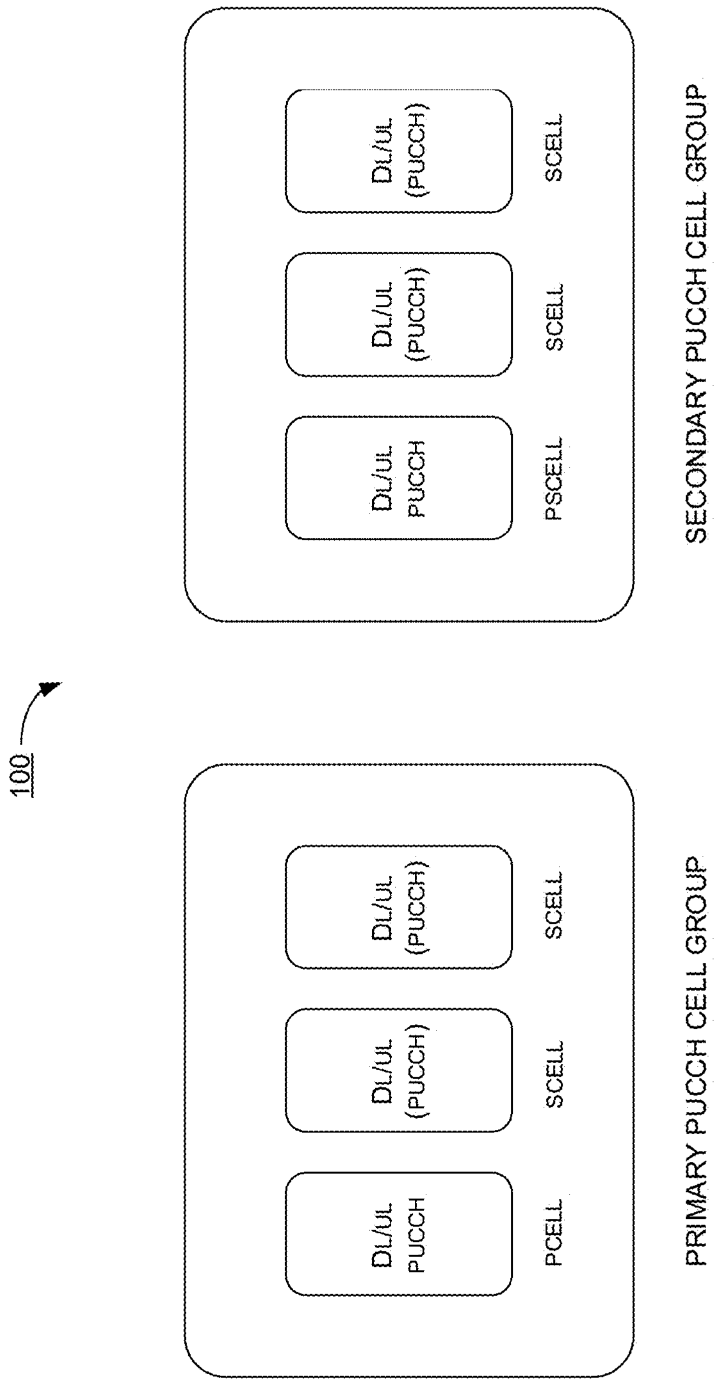
FIG. 1 is a diagram depicting an example scenario of PUCCH cell groups in accordance with implementations of the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to dynamic cross-carrier scheduling for latency enhancement with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In current NR framework, cross-carrier scheduling for UCI transmission (e.g., PUCCH) is not supported. In 3GPP Release-16, PUCCH carrier is semi-statically configured to a single cell within a PUCCH cell group. In a TDD system, the uplink/downlink TDD pattern is the bottleneck for the URLLC latency. TDD allows uplink and downlink to use the entire frequency spectrum, but in different time slots. Time is divided up into short slots and some are designated for uplink while others are designated for downlink. This approach enables asymmetric traffic and time-varying uplink and downlink demands. However, since PUCCH can only be scheduled in uplink slots, in an event that TDD pattern allocate more slots as downlink slots, the duration between uplink slots will be drawn too long and cause long latency. The worst case PUCCH alignment delay is dominated by the length of downlink and uplink and may be prohibitive to apply URLLC retransmission. Therefore, there is a need to introduce cross-carrier scheduling on PUCCH transmission and enhance UCI transmission for URLLC.

In view of the above, the present disclosure proposes schemes pertaining to PUCCH carrier switching for HARQ feedback, and more particularly to scheduling of PUCCH carrier switching with respect to the UE and network apparatus in mobile communications. According to the schemes of the present disclosure, a CA system of TDD carriers with an appropriate slot offset between uplink slots on different CC's is supported. The UE can be configured with semi-static cross-carrier scheduling for PUCCH. Switching of CC used for PUCCH (referred to herein as PUCCH carrier switching) can help to reduce the latency for CA with two or multiple carriers having different TDD patterns. Accordingly, by applying the schemes of the present disclosure, the performance of HARQ feedback transmission can be improved to reduce alignment delay/latency. Applications with URLLC requirements can benefit from the enhancements achieved by the implementations of the present disclosure.

FIG. 1 illustrates an example scenario 100 of PUCCH cell groups in accordance with implementations of the present disclosure. Scenario 100 illustrates an example of a UE being configured with two PUCCH cell groups, including the primary PUCCH cell group and the secondary PUCCH cell group. Each PUCCH cell group is a group of serving cells (each corresponds to a CC) sharing the same serving cell for PUCCH transmission. For each cell, PUCCH transmission may take place on the primary cell (PCell) if the cell is in the primary PUCCH cell group, or on the PUCCH SCell (PSCell) if the cell is in the secondary PUCCH cell group. In one novel aspect, the UE may also be configured with a PUCCH carrier pattern which configures, per PUCCH cell group, more SCell(s) other than just the PCell/PSCell, which can be used for PUCCH transmission.

Figure 2:
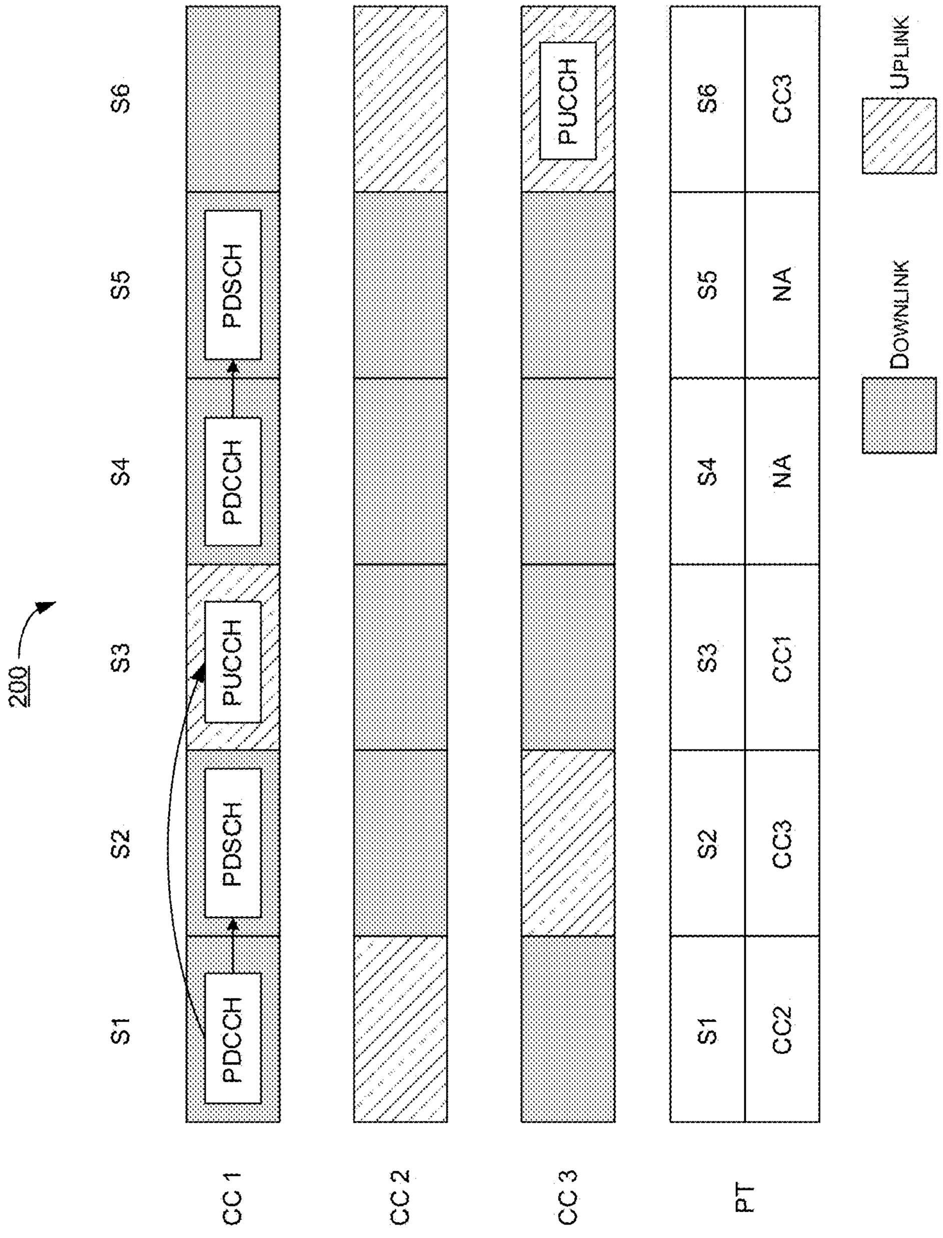
FIG. 2 is a diagram depicting an example scenario under schemes in accordance with implementations of the present disclosure.

FIG. 2 illustrates example scenario 200 under schemes in accordance with implementations of the present disclosure. Scenario 200 involves a UE and a plurality of network nodes, which may be a part of a wireless communication network (e.g., an LTE network, a 5G network, an NR network, an IoT network or an NB-IOT network). Scenario 200 illustrates an example of semi-static cross-carrier scheduling for PUCCH. The UE may be configured with a plurality of CCs such as a first CC (e.g., CC 1), a second CC (e.g., CC 2), and a third CC (e.g., CC 3) in a PUCCH cell group (e.g., the primary PUCCH cell group). The first CC, the second CC, and the third CC may have identical or different TDD patterns for uplink/downlink slots. For example, the ration of downlink slot to uplink slot is 3:1 for CC 1, 4:1 for CC 2, and 3:1 for CC 3. To reduce the alignment delay, the UE may be configured with semi-static switching of CC used for PUCCH.

Specifically, the UE may receive a PDCCH on the first CC (e.g., corresponds to the PCell). The PDCCH may schedule a PDSCH on the first CC. The UE may receive downlink data on the PDSCH on the first CC scheduled by the PDCCH. Then, the UE may further receive a PUCCH carrier pattern on the first CC via a semi-static configuration. The network node may define the PUCCH carrier pattern and semi-statically signal the PUCCH carrier pattern as part of the configuration for the PUCCH cell group to the UE via a RRC signal.

To reduce latency, the PUCCH may be scheduled on another CC (e.g., second CC or third CC) different from the first CC. The PUCCH carrier pattern may indicate scheduled PUCCH carrier for transmitting the UCI. For example, the PUCCH carrier pattern configures CC 2 that is available for transmitting UCI in first slot S1, configures CC 3 that is available for transmitting UCI in second slot S2, configures CC 1 that is available for transmitting UCI in third slot S3, and configures CC 3 that is available for transmitting UCI in sixth slot S6. Among CC 1, CC 2, and CC 3, there is no uplink slot configured in the fourth slot S4 and the fifth slot S5, so the PUCCH carrier pattern does not indicate any CC in the fourth slot S4 and the fifth slot S5. The DCI may indicate which slot to transmit the UCI. Therefore, the UE will know which CC is used for PUCCH transmission, and transmit the UCI (e.g., HARQ-ACK) corresponding to the downlink data on the PUCCH on the second CC according to the PUCCH carrier pattern. The UE may perform a PUCCH carrier switching, from the first CC to the second CC or to the third CC, when transmitting UCI corresponding to the downlink data.

The PUCCH carrier pattern configures multiple CCs to use for PUCCH transmission. Some restrictions on the number of selectable CC could apply. For example, only a pre-determined number of CCs (e.g., K=3 CCs) could be used to transmit the UCI. The UE may receive the PUCCH carrier pattern (e.g., via RRC configuration or DCI indication) configuring the first CC (e.g., CC 1), the second CC (e.g., CC 2), and the third CC (e.g., CC 3) within a cell group that can be used to transmit the UCI. For example, appointing multiple serving cells within cell group to use for PUCCH may be supported (e.g., per PDSCH-ServingCell configuration). PUCCH-Cell field of PDSCH-ServingCell-Config should be allowed to list at most K elements of ServCellIndex. The UCI carried by the PUCCH is independent from the CC selected for PUCCH transmission (e.g., CC 2). For different cell groups, a single PUCCH carrier pattern is configured per PUCCH cell group.

The PUCCH carrier pattern is configured in the time domain. In other words, the PUCCH carrier pattern is a time-domain pattern. A plurality of slots are configured in the time domain. The PUCCH cell group may have two cells that are PUCCH carriers (e.g. primary cell (PCell) and secondary cell (SCell)), the UE could be signaled with the PUCCH carrier pattern based on slots. For instance, PUCCH carrier pattern [S. P. P. S. P] means using SCell for PUCCH transmission on the first slot, using PCell for PUCCH transmission on the second slot, using PCell for PUCCH transmission on the third slot, using SCell for PUCCH transmission on the fourth slot, and using PCell for PUCCH transmission on the fifth slot.

The PUCCH carrier pattern indicates one of the first CC, the second CC, and the third CC for at least one of the slots. The PUCCH carrier pattern defines one of the PCell/PSCell/PUCCH-SCell for each of the slots, so each of the slots is mapping to one of the PCell and the SCell. Specifically, in the first CC, the second CC, and the third CC, each of the slots may configured as uplink slot or downlink slot, uplink resources may be scheduled in the uplink slot, and downlink resources may be scheduled in the downlink sot. Each of uplink slots and its corresponding CC will be configured in the PUCCH carrier pattern for PUCCH transmission. However, among the first CC, the second CC, and the third CC, if there are two or more uplink slots are configured in the same slot, only one of them will be configured in the PUCCH carrier pattern. Even if the UE knows there are two or more CCs can be used for transmitting the UCI in the same slot, the UE may only transmit UCI in the uplink slot and its corresponding CC that is pre-determined in the PUCCH carrier pattern.

In some implementations, the length of the PUCCH carrier pattern may be variable from 1 to maximum number of the slots in a frame. Specifically, slot length gets different depending on numerology, and numerology indicates subcarrier spacing (SCS) type. For normal cyclic prefix (CP) and slot configuration 0, if numerology is 0, the corresponding SCS is 15 kHz, and the slot length is 1 millisecond (ms). If numerology is 1, the corresponding SCS is 30 kHz, and the slot length is 0.5 ms. If numerology is 2, the corresponding SCS is 60 kHz, and the slot length is 0.25 ms. If numerology is 3, the corresponding SCS is 120 kHz, and the slot length is 0.125 ms. If numerology is 4, the corresponding SCS is 240 kHz, and the slot length is 0.0625 ms. Therefore, slot length gets shorter as subcarrier spacing gets wider. Thus, minimum length (i.e., one slot) of the PUCCH carrier pattern may get shorter as SCS gets wider, and maximum length (i.e., one frame) of the PUCCH carrier pattern may be the same at different SCS.

In some implementations, the first CC, the second CC, and the third CC may be configured with different numerologies. In an event that the numerology of the CC for receiving PDCCH and downlink data is different from the numerology of the CC for transmitting UCI, timing offsets in the scheduling assignment, for example, which slot the assignment relates to, are interpreted in the PDSCH numerology.

In some implementations, the PUCCH carrier pattern may be configured at slot granularity. The minimum scheduling time granularity of the PUCCH carrier pattern is one slot of the PCell/PSCell/PUCCH-SCell. The length of slot in time varies depending on numerology. As mentioned above, slot length gets shorter as SCS gets wider. Therefore, in perspective of the slot length, the slot granularity gets smaller as SCS gets wider. In most numerology, minimum time scheduling granularity of NR is much smaller than 1 ms.

Illustrative Implementations

Figure 3:
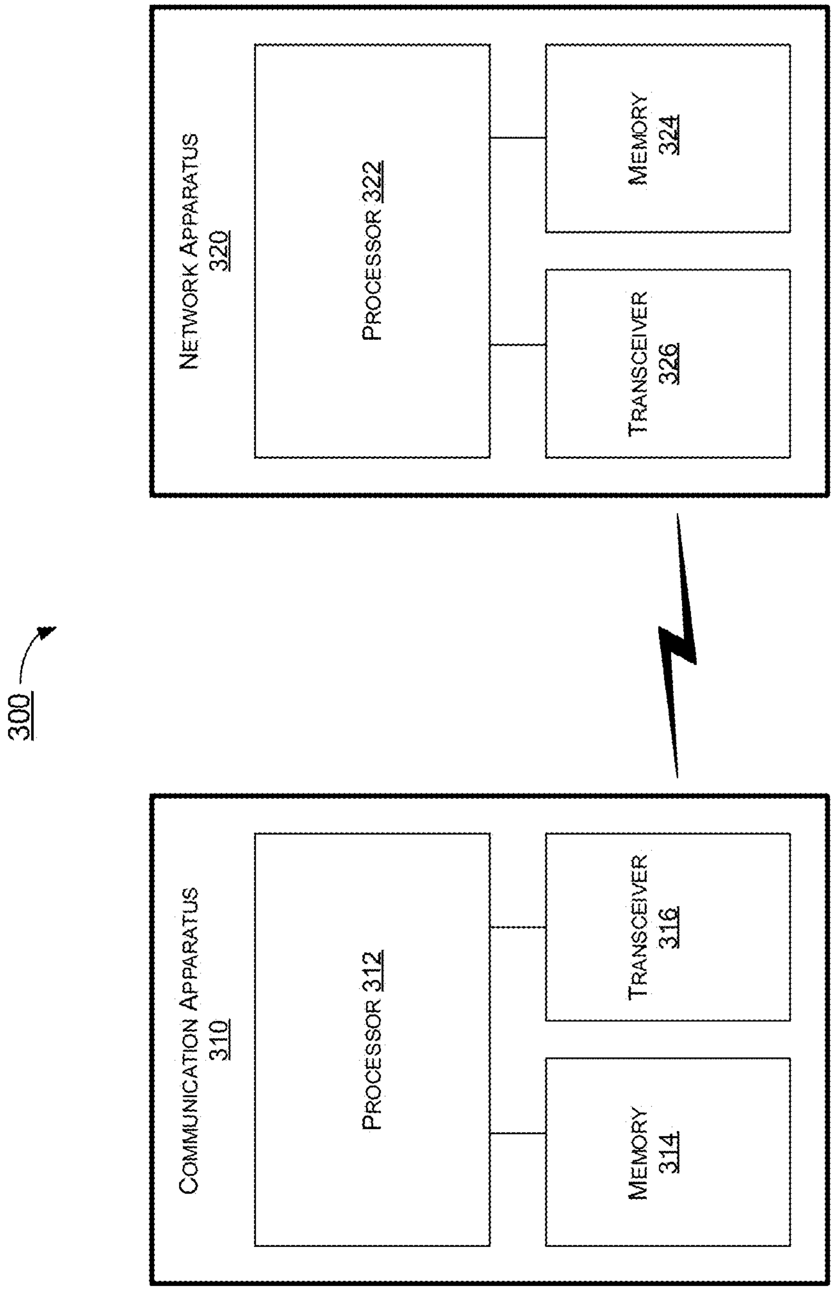
FIG. 3 is a block diagram of an example communication system in accordance with an implementation of the present disclosure.

FIG. 3 illustrates an example communication system 300 having an example communication apparatus 310 and an example network apparatus 320 in accordance with an implementation of the present disclosure. Each of communication apparatus 310 and network apparatus 320 may perform various functions to implement schemes, techniques, processes and methods described herein pertaining to scheduling of PUCCH carrier switching with respect to user equipment and network apparatus in mobile communications, including scenarios/schemes described above as well as process 400 described below.

Communication apparatus 310 may be a part of an electronic apparatus, which may be a UE such as a portable or mobile apparatus, a wearable apparatus, a wireless communication apparatus or a computing apparatus. For instance, communication apparatus 310 may be implemented in a smartphone, a smartwatch, a personal digital assistant, a digital camera, or a computing equipment such as a tablet computer, a laptop computer or a notebook computer. Communication apparatus 310 may also be a part of a machine type apparatus, which may be an IoT, NB-IoT, or IIoT apparatus such as an immobile or a stationary apparatus, a home apparatus, a wire communication apparatus or a computing apparatus. For instance, communication apparatus 310 may be implemented in a smart thermostat, a smart fridge, a smart door lock, a wireless speaker or a home control center. Alternatively, communication apparatus 310 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 310 may include at least some of those components shown in FIG. 3 such as a processor 312, for example. Communication apparatus 310 may further include one or more other components not pertinent to the proposed scheme of the present disclosure (e.g., internal power supply, display device and/or user interface device), and, thus, such component(s) of communication apparatus 310 are neither shown in FIG. 3 nor described below in the interest of simplicity and brevity.

Network apparatus 320 may be a part of an electronic apparatus, which may be a network node such as a base station, a small cell, a router or a gateway. For instance, network apparatus 320 may be implemented in an eNodeB in an LTE, LTE-Advanced or LTE-Advanced Pro network or in a gNB in a 5G. NR, IoT, NB-IOT or IIOT network. Alternatively, network apparatus 320 may be implemented in the form of one or more IC chips such as, for example and without limitation, one or more single-core processors, one or more multi-core processors, or one or more RISC or CISC processors. Network apparatus 320 may include at least some of those components shown in FIG. 3 such as a processor 322, for example. Network apparatus 320 may further include one or more other components not pertinent to the proposed scheme of the present disclosure (e.g., internal power supply, display device and/or user interface device), and, thus, such component(s) of network apparatus 320 are neither shown in FIG. 3 nor described below in the interest of simplicity and brevity.

In one aspect, each of processor 312 and processor 322 may be implemented in the form of one or more single-core processors, one or more multi-core processors, or one or more CISC processors. That is, even though a singular term "a processor" is used herein to refer to processor 312 and processor 322, each of processor 312 and processor 322 may include multiple processors in some implementations and a single processor in other implementations in accordance with the present disclosure. In another aspect, each of processor 312 and processor 322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 312 and processor 322 is a special-purpose machine specifically designed, arranged and configured to perform specific tasks including power consumption reduction in a device (e.g., as represented by communication apparatus 310) and a network (e.g., as represented by network apparatus 320) in accordance with various implementations of the present disclosure.

In some implementations, communication apparatus 310 may also include a transceiver 316 coupled to processor 312 and capable of wirelessly transmitting and receiving data. In some implementations, communication apparatus 310 may further include a memory 314 coupled to processor 312 and capable of being accessed by processor 312 and storing data therein. In some implementations, network apparatus 320 may also include a transceiver 326 coupled to processor 322 and capable of wirelessly transmitting and receiving data. In some implementations, network apparatus 320 may further include a memory 324 coupled to processor 322 and capable of being accessed by processor 322 and storing data therein. Accordingly, communication apparatus 310 and network apparatus 320 may wirelessly communicate with each other via transceiver 316 and transceiver 326, respectively. To aid better understanding, the following description of the operations, functionalities and capabilities of each of communication apparatus 310 and network apparatus 320 is provided in the context of a mobile communication environment in which communication apparatus 310 is implemented in or as a communication apparatus or a UE and network apparatus 320 is implemented in or as a network node of a communication network.

In some implementations, processor 312 may receive, via transceiver 316, a PDCCH on the first CC. The PDCCH may schedule a PDSCH on the first CC. Processor 312 may receive, via transceiver 316, downlink data on the PDSCH on the first CC scheduled by the PDCCH. Also, processor 312 may receive, via transceiver 316, a PUCCH carrier pattern on the first CC, wherein the PUCCH carrier pattern is configured per PUCCH cell group. To reduce latency, the PUCCH may be scheduled on a different CC. For example, the PUCCH carrier pattern may indicate that the closest uplink slot for PUCCH transmission is allocated on the second CC. Then, processor 312 may transmit UCI (that includes the HARQ-ACK information) corresponding to the downlink data on a PUCCH on the second CC to the network node based on the PUCCH carrier pattern.

In some implementations, processor 312 may receive, via transceiver 316, a configuration (e.g., RRC configuration)

configuring a plurality of CCs within a PUCCH cell group that can be used to transmit the PUCCH, and the PUCCH carrier pattern may be configured as part of the configuration.

Illustrative Processes

Figure 4:
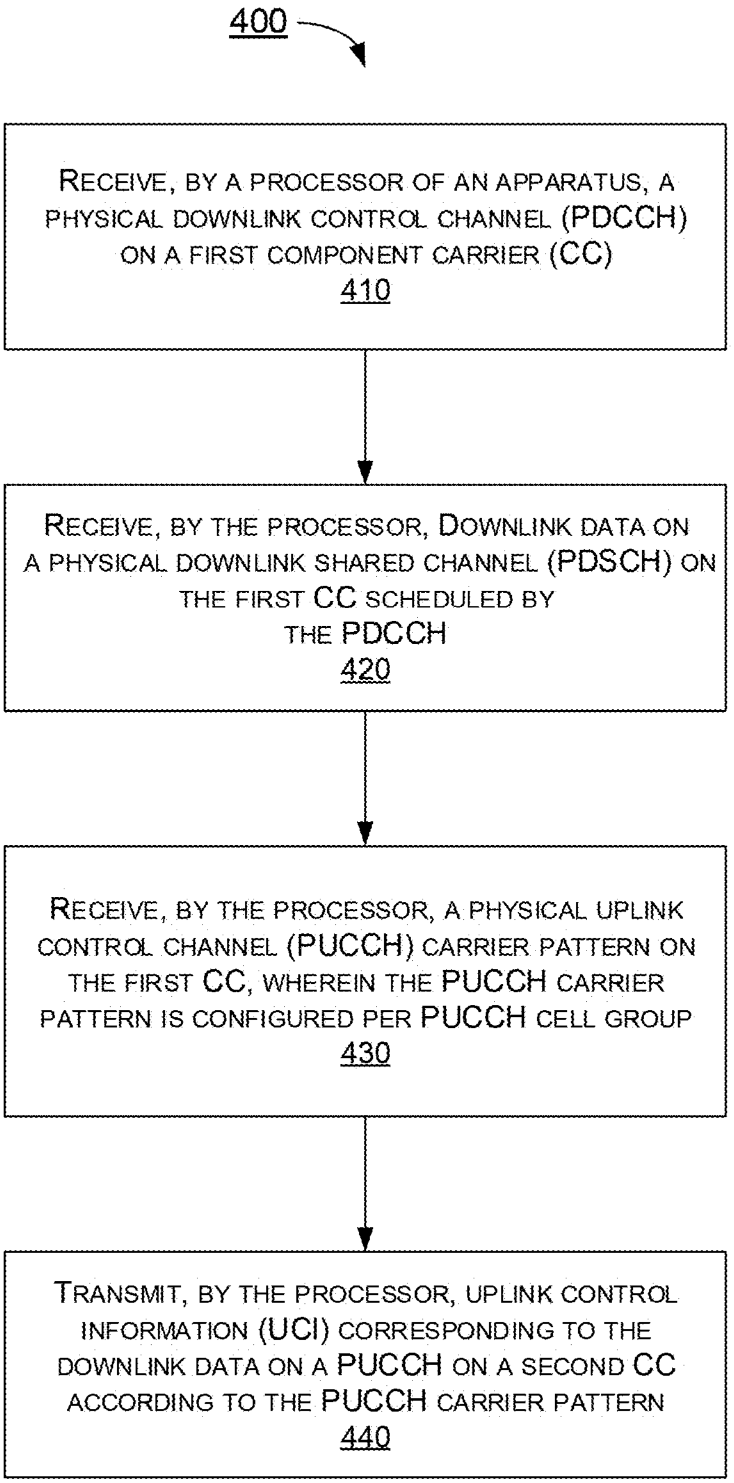
FIG. 4 is a flowchart of an example process in accordance with an implementation of the present disclosure.

FIG. 4 illustrates an example process 400 in accordance with an implementation of the present disclosure. Process 400 may be an example implementation of schemes described above, whether partially or completely, with respect to scheduling of PUCCH carrier switching for latency enhancement with the present disclosure. Process 400 may represent an aspect of implementation of features of communication apparatus 310. Process 400 may include one or more operations, actions, or functions as illustrated by one or more of blocks 410, 420, 430, and 440. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order. Process 400 may be implemented by communication apparatus 310 or any suitable UE or machine type devices. Solely for illustrative purposes and without limitation, process 400 is described below in the context of communication apparatus 310. Process 400 may begin at block 410.

At 410, process 400 may involve processor 312 of apparatus 310 receiving a PDCCH on a first CC. Process 400 may proceed from 410 to 420.

At 420, process 400 may involve processor 312 receiving downlink data on a PDSCH on the first CC scheduled by the PDCCH. Process 400 may proceed from 420 to 430.

At 430, process 400 may involve processor 312 receiving a PUCCH carrier pattern on the first CC, wherein the PUCCH carrier pattern is configured per PUCCH cell group. Process 400 may proceed from 430 to 440.

At 440, process 400 may involve processor 312 transmitting UCI corresponding to the downlink data on a PUCCH on a second CC according to the PUCCH carrier pattern.

In some implementations, the PUCCH carrier pattern configures the first CC and the second CC within a PUCCH cell group that can be used to transmit the UCI.

In some implementations, the PUCCH carrier pattern is configured as part of the configuration for the PUCCH cell group.

In some implementations, the configuration is received via a RRC signal.

In some implementations, the PUCCH carrier pattern is configured in a time domain.

In some implementations, a plurality of slots are configured in the time domain, and the PUCCH carrier pattern indicates one of the first CC and the second CC for at least one of the slots.

In some implementations, the slot granularity of the PUCCH carrier pattern is based on a numerology of a PCell.

In some implementations, the first CC corresponds to the PCell.

In some implementations, the numerology indicates a SCS of the PCell.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase “A or B” will be understood to include the possibilities of “A” or “B” or “A and B.”

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

receiving, by a processor of an apparatus, a physical downlink control channel (PDCCH) on a first component carrier (CC);

receiving, by the processor, downlink data on a physical downlink shared channel (PDSCH) on the first CC scheduled by the PDCCH;

receiving, by the processor, a physical uplink control channel (PUCCH) carrier pattern on the first CC, wherein the PUCCH carrier pattern is configured per PUCCH cell group, wherein the PUCCH carrier pattern is configured in a time domain, and wherein a plurality of slots are configured in the time domain, and the PUCCH carrier pattern indicates one of the first CC and the second CC for at least one of the slots; and transmitting, by the processor, uplink control information (UCI) corresponding to the downlink data on a PUCCH on a second CC according to the PUCCH carrier pattern.

2. The method of claim 1, wherein the PUCCH carrier pattern configures the first CC and the second CC within a PUCCH cell group that can be used to transmit the UCI.

3. The method of claim 2, wherein the PUCCH carrier pattern is configured as part of a configuration for the PUCCH cell group.

4. The method of claim 3, wherein the configuration is received via a radio resource control (RRC) signal.

5. The method of claim 1, wherein the slot granularity of the PUCCH carrier pattern is based on a numerology of a primary cell (PCell).

6. The method of claim 5, wherein the first CC corresponds to the PCell.

7. The method of claim 5, wherein the numerology indicates a subcarrier spacing (SCS) of the PCell.

8. An apparatus, comprising:

a transceiver which, during operation, wirelessly communicates with a network node of a wireless network; and a processor communicatively coupled to the transceiver such that, during operation, the processor performs operations comprising:

receiving, via the transceiver, a physical downlink control channel (PDCCH) on a first component carrier (CC);

receiving, via the transceiver, downlink data on a physical downlink shared channel (PDSCH) on the first CC scheduled by the PDCCH;

receiving, via the transceiver, a physical uplink control channel (PUCCH) carrier pattern on the first CC, wherein the PUCCH carrier pattern is configured per PUCCH cell group, wherein the PUCCH carrier pattern is configured in a time domain, and wherein a plurality of slots are configured in the time domain, and the PUCCH carrier pattern indicates one of the first CC and the second CC for at least one of the slots; and transmitting, via the transceiver, uplink control information (UCI) corresponding to the downlink data on a PUCCH on a second CC according to the PUCCH carrier pattern.

9. The apparatus of claim 8, wherein the PUCCH carrier pattern configures the first CC and the second CC within a PUCCH cell group that can be used to transmit the UCI.

10. The apparatus of claim 9, wherein the PUCCH carrier pattern is configured as part of a configuration for the PUCCH cell group.

11. The apparatus of claim 10, wherein the configuration is received via a radio resource control (RRC) signal.

12. The apparatus of claim 8, wherein the slot granularity of the PUCCH carrier pattern is based on a numerology of a primary cell (PCell).

13. The apparatus of claim 12, wherein the first CC corresponds to the PCell.

14. The apparatus of claim 12, wherein the numerology indicates a subcarrier spacing (SCS) of the PCell.

* * * * *